US006232583B1

(12) United States Patent
Uhm

(10) Patent No.: US 6,232,583 B1
(45) Date of Patent: May 15, 2001

(54) INFRARED HIGH TEMPERATURE MEASUREMENT OF OPTICAL FIBER DURING DRAW

(75) Inventor: Daniel D. Uhm, Cornelius, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/377,995

(22) Filed: Aug. 20, 1999

(51) Int. Cl.$^7$ ..................................................... H05B 1/02
(52) U.S. Cl. ........................ 219/497; 219/506; 219/494; 374/137; 374/124; 65/384
(58) Field of Search ..................................... 219/497, 501, 219/505, 506, 494, 499; 364/557; 374/121, 124, 127, 131, 137; 65/384

(56) References Cited

U.S. PATENT DOCUMENTS

| | | |
|---|---|---|
| 4,576,485 | 3/1986 | Lambert . |
| 5,086,220 | 2/1992 | Berthlold et al. . |
| 5,180,226 * | 1/1993 | Moslehi ............................... 374/127 |
| 5,561,294 | 10/1996 | Iddan . |
| 5,730,527 * | 3/1998 | Takayama ............................. 374/131 |

FOREIGN PATENT DOCUMENTS

| | | |
|---|---|---|
| 60-16377 | 4/1985 | (JP) . |
| 61-86442 | 5/1986 | (JP) . |
| 3-37129 | 2/1991 | (JP) . |
| 4193731 | 7/1992 | (JP) . |
| 5186239 | 7/1993 | (JP) . |
| 6-72737 | 3/1994 | (JP) . |
| 9915470 | 4/1999 | (WO) . |

OTHER PUBLICATIONS

"Patent Abstract of Japan," M. Ito et al., "Measurement of Temperature of Preform Material for Spinning Fiber", Application No. 4–4062, Jul. 27, 1993.

"Patent Abstract of Japan," K. Hirano, "Method of Controlling Heating Furnace of Spinning Machine", Application No. 4–248606, Mar/ 15, 1994.

"Patent Abstract of Japan," No. J6 1086–442–A, Hitachi Cable KK, "Manufacturing of parent material for optical fibre–using bath temperature detector to control burner giving improved constancy of temperatire".

"Patent Abstract of Japan," No. J8 5016–377–B, Nippon Telegraph & Telephone, "Optical fibre drawing appts.–produces optical fibre by drawing of a preform rod".

(List continued on next page.)

Primary Examiner—Mark Paschall
(74) Attorney, Agent, or Firm—Ware, Fressola, Van Der Sluys & Adolphson LLP

(57) ABSTRACT

A fiber draw furnace for drawing a fiber from a preform has a thermographic sensor in combination with a thermographic profiling processor. The thermographic sensor responds to infrared energy radiating from the fiber, for providing a thermographic sensor signal containing information about the infrared energy radiating from the fiber. The thermographic profiling processor responds to the thermographic sensor signal, for providing a thermographic profiling processor signal containing information about a thermographic profile of variations in the heat emitted across the width or along the length of the fiber. The fiber is typically quartz glass. The thermographic sensor includes an infrared filter and lens combination for filtering out infrared energy outside a range of 8–12 microns radiating from the quartz fiber. The thermographic sensor includes a lens and an infrared sensor for focusing and sensing infrared energy inside a range of 8–12 microns radiating from the quartz fiber. The quartz fiber typically has a temperature in a range of 500 to 2,000 degrees Celsius. The thermographic sensor signal contains information about the infrared energy radiating from the quartz fiber in a temperature range of 500 to 2,000 degrees Celsius.

25 Claims, 4 Drawing Sheets

OTHER PUBLICATIONS

"Patent Abstract of Japan," JO 3037–129–A, Asahi Optical KK, "Production of optical glass fibre with uniform diameter, comprises spinning multi–fibre from neck down part of preform in heating furnace".

"Patent Abstract of Japan," N. Mitomi et al, "Production of Optical Fiber Base Material", Application No. 2–321635 Jul.13, 1992.

"Patent Abstract of Japan," H. kenichi, No. JP 06 072737 A, Fujikura Ltd., "Method for Controlling Heating Furnace of Spinning Machine", 15 Mar. 1994.

"Patent Abstract of Japan, " K. Takehiro, No. JP 63 195139, Hitachi Cable Ltd., "Apparatus for Drawing Glass Rod", 12 Aug. 1988.

* cited by examiner-

INFRARED HIGH TEMPERATURE MEASUREMENT OF OPTICAL FIBER DURING DRAW

BACKGROUND OF THE INVENTION

1. Technical Field

This invention relates to a fiber temperature sensor and processor device for an optical fiber draw furnace; and more particularly to high temperature measurement of optical fiber in excess of 1000 degrees Celsius during a fiber draw process.

2. Description of Related Art

There are no practical ways to measure the high temperature of optical fiber in excess of 500 degrees Celsius during the fiber draw process. There is a real need in the industry to do so. All the known ways that measure the low temperature of optical fiber significantly below 1000 degrees Celsius during the fiber draw process have limited temperature range, inaccuracy and unreliability, require precise fiber alignment and very close proximity to fiber making a measurement difficult, and are impractical for high temperature measurement. See U.S. Pat. No. 4,576,485.

As described in an abstract, Japanese Patent No. 60-163,377 discloses an optical fiber drawing apparatus having an electronic circuit to take out a temperature signal from an intensity component of an infrared ray signal detected from a heated optical fiber and an outer diameter signal from its period component. The temperature of the fiber appears to be determined from the intensity of an infrared signal using a scanning beam technique. For example, the optical fiber is scanned as shown in FIG. 3(a), the pulse height determines the optical fiber temperature as shown in FIG. 3(b), and the pulse width determines the outer diameter of the optical fiber as shown in FIG. 3(c). The signal from the detector appears to be used to control the extrusion rate of the fiber and the speed of a drum 11. The optical fiber drawing apparatus does not use thermographic imaging (i.e. a temperature distribution image) of the optical fiber. The optical fiber drawing apparatus does not provide thermographic sensing or profile processing of the optical fiber.

SUMMARY OF THE INVENTION

The basic idea of the present invention is to use infrared (IR) energy to measure optical fiber temperature during the fiber draw process.

The present invention provides a fiber draw furnace for drawing a fiber from a preform comprising a thermographic sensor in combination with a thermographic profiling processor.

The thermographic sensor responds to infrared energy radiating from the fiber, for providing a thermographic sensor signal containing information about the infrared energy radiating from the fiber.

The thermographic profiling processor responds to the thermographic sensor signal, for providing a thermographic profiling processor signal containing information about a thermographic profile of variations in the heat emitted by the fiber.

The fiber is typically quartz glass; and the thermographic sensor includes an infrared filter for filtering out infrared energy outside a range of 8–12 microns radiating from the quartz fiber, and also includes a lens and infrared sensor for focusing and sensing infrared energy inside a range of 8–12 microns radiating from the quartz fiber.

The quartz fiber typically has a temperature in a range of 500 to 2,000 degrees Celsius. The thermographic sensor signal contains information about the infrared energy radiating from the quartz fiber in a temperature range of 500 to 2,000 degrees Celsius.

The thermographic profile includes variations in the heat emitted across the width or along the length of the fiber.

The thermographic profiling processor may include microprocessor circuitry having a combination of a microprocessor, a random access memory, a read only memory, an input/output device, and an address, control and data bus for connecting the combination.

The thermographic profiling processor signal contains information either to control the temperature of the fiber draw furnace, the speed of the fiber being drawn from the preform, or both.

The fiber draw furnace has a furnace temperature controller that responds to the thermographic profiling processor signal, for providing a furnace temperature control signal to control the temperature of the fiber draw furnace.

The fiber draw furnace also has a capstan and spool speed controller that responds to the thermographic profiling processor signal, for providing a capstan and spool speed controller signal to control the speed of a capstan and spool drawing and winding the fiber from the preform.

In operation, the fiber draw furnace uses high sensitivity infrared (IR) thermographic technology (including commercial measurement systems) to optically scan the natural infrared radiation associated with the fiber. The temperature signal attained through optical scanning of infrared radiation is converted into a thermographic image of the optical fiber (i.e. a temperature distribution image). The signal/image is then converted into a temperature reading. Use of filters (specific wavelengths) and cooling of the sensor detector may be necessary to obtain an accurate temperature reading using this technique for glass fiber at high or low temperatures.

One advantage of the present invention is that infrared (IR) measurement of optical fiber is accurate and practical for production use. Infrared energy can be sensed and measured by the temperature of the fiber during draw anywhere along the visible fiber path, and does not require precise fiber alignment while a distance of several inches can be maintained from the fiber path.

Another advantage of the present invention is that the thermographic sensor and profiling processor device can provide a valuable research tool to collect data related to a drawn fiber that allows one to study and determine physical and optical properties about the drawn fiber, including cooling rates and temperature profiles, that have otherwise to date only been determined via modelling or theoretically.

A DESCRIPTION OF THE DRAWING

For a fuller understanding of the nature of the invention, reference should be made to the following detailed descriptions taken in connection with the accompanying drawing, not in scale, in which.

DETAILED DESCRIPTION OF THE INVENTION

Figure 1:
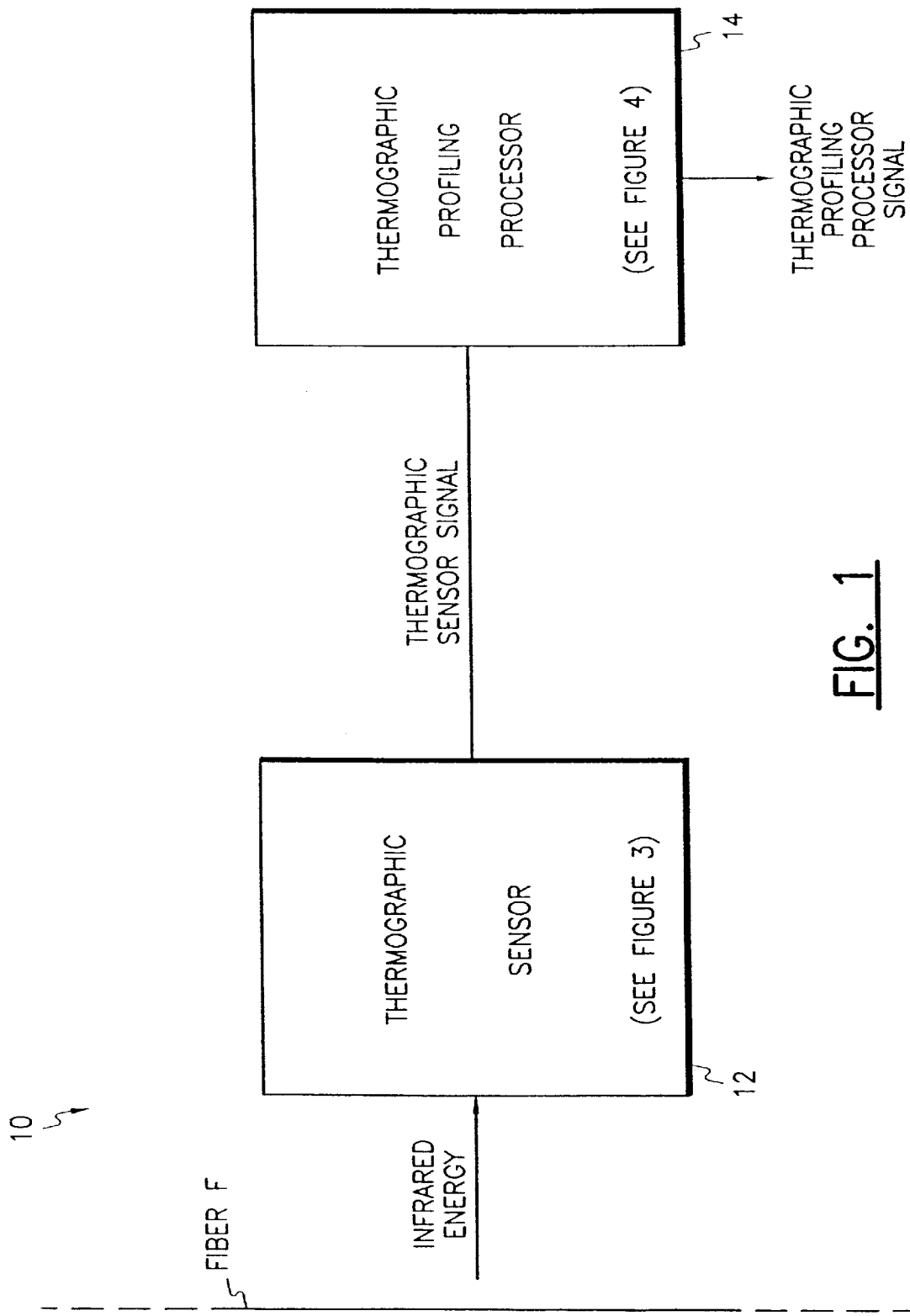
FIG. 1 is a block diagram of a thermographic sensor and processor device that is the subject matter of the present invention.

FIG. 1: The Basic Invention

FIG. 1 shows a thermographic sensor and processor device generally indicated as 10 for a fiber draw furnace (FIG. 2) having a thermographic sensor 12 in combination with a thermographic profiling processor 14.

The thermographic sensor 12 responds to infrared energy radiating from a fiber F, for providing a thermographic sensor signal containing information about the infrared energy radiating from the fiber F.

The thermographic profiling processor 14 responds to the thermographic sensor signal, for providing a thermographic profiling processor signal containing information about a thermographic profile of variations in the heat emitted by the fiber F. The thermographic profile includes variations in the heat emitted across the width or along the length of the fiber F. The thermographic profiling processor signal may contain information either to control the temperature of the fiber draw furnace, the speed of the fiber F being drawn from the preform, or both, as shown and discussed below in more detail.

In the alternative, the information about the thermographic profile of the fiber F may be passed along via the thermographic profiling processor signal to another component in the fiber draw furnace, such as a furnace temperature controller or fiber draw speed controller, for processing in relation to the generation of one or more fiber draw furnace control signal. The scope of the invention is not intended to be limited to where or how the thermographic profile of the fiber is processed to determine the one or more fiber draw furnace control signal.

Figure 2:
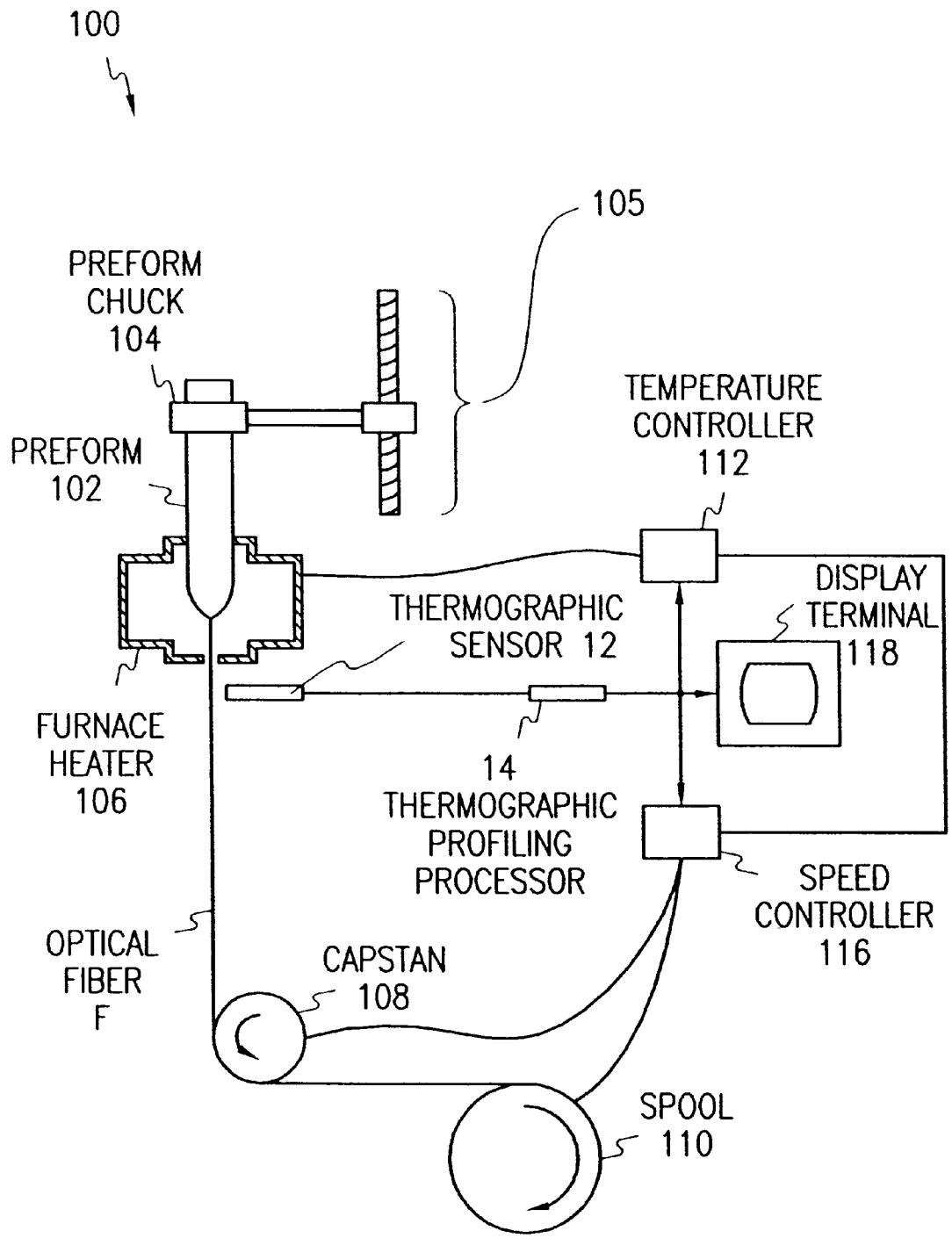
FIG. 2 is a diagram of a fiber optic draw furnace having the thermographic sensor and processor device shown in FIG. 1.

FIG. 2: The Fiber Draw Furnace 100

FIG. 2 shows a fiber draw furnace generally indicated as 100, having the thermographic sensor 12 and the thermographic profiling processor 14 shown in FIG. 1.

In addition thereto, the fiber draw furnace 100 also has a preform 102 arranged in a preform chuck 104 and a preform lower and raising means 105, a furnace heater 106 for heating the preform 102, a capstan 108 for drawing a quartz fiber F, a spool 110 for winding the fiber F, a temperature controller 112 for controlling the furnace heater 106, a speed controller 116 for controlling the capstan 108 and the spool 110, and a display terminal 118 for displaying control information in relation to the operation of the fiber draw furnace 100. These components of the fiber draw furnace 100 are known in the art, and the scope of the invention is not intended to be limited to any particular type thereof.

In operation, the furnace heater 106 responds to a furnace heater control signal from the temperature controller 112, for heating the preform 102. The capstan 108 and the spool 110 respond to a speed controller signal from the speed controller 116, for drawing the fiber F from the preform 102 at a given speed. The infrared thermographic sensor 12 responds to infrared energy radiating from the fiber F being drawn from the preform 102, for providing the infrared thermographic sensor signal containing information about the infrared energy radiating from the fiber F. The thermographic profiling processor 14 responds to the infrared thermographic sensor signal from the thermographic sensor 12, for providing a thermographic profiling processor signal containing information to control the temperature of the fiber draw furnace 106 and the given speed of the capstan 108 and the spool 110 drawing the fiber F from the preform 102. The furnace heater temperature controller 112 responds to the thermographic profiling processor signal from the thermographic profiling processor 14, for providing the furnace heater control signal to the furnace heater 106 to control the temperature of the furnace heater 106 heating the preform 102. The speed controller 116 responds to the thermographic profiling processor signal from the thermographic profiling processor 14, for providing the speed controller signal to the capstan 108 and the spool 110 to control the speed of the capstan 108 and the spool 110 drawing and winding the fiber F from the preform 102.

Figure 3:
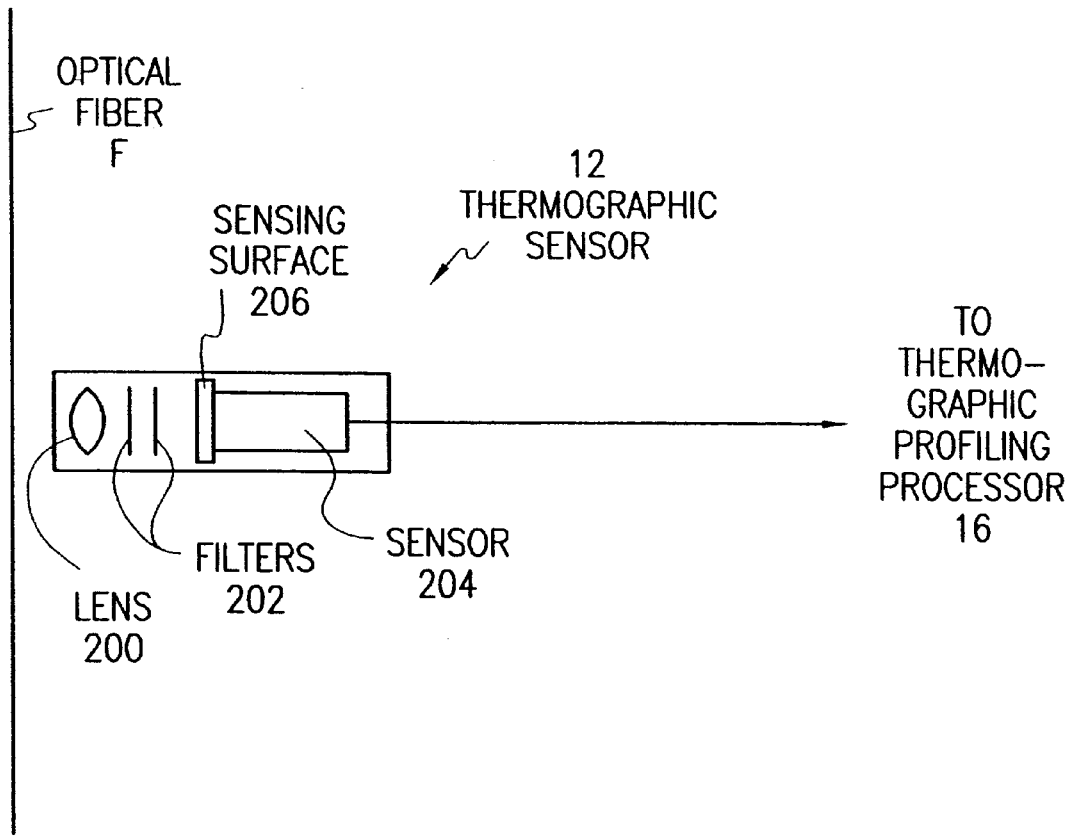
FIG. 3 is an enlarged view of a thermographic sensor 12 shown in FIGS. 1 and 2.

FIG. 3: Thermographic Sensor 12

FIG. 3 shows the thermographic sensor 12 in greater detail. The thermographic sensor 12 includes a lens 200, one or more filters 202 and a sensor 204.

The lens 200 and the infrared sensor 204 focus and sense infrared energy inside a range of 8–12 microns radiating from the quartz fiber F. The lens 200 and the infrared sensor 204 are known in the art and readily available commercially. As shown, the infrared sensor 204 has a sensing surface 206 for sensing the infrared energy.

The infrared filter 202 filters out infrared energy outside a range of 8–12 microns radiating from the quartz fiber F. The infrared filter 202 filters out background and other undesirable surface light (radiation), including light from the fiber draw furnace room as well as light reflected from inside the furnace, and only allows infrared radiation coming from the optical fiber F to be sensed. The filter 202 is known in the art and readily available commercially. The scope of the invention is not intended to be limited to any particular order of the lens 200 and the filter 202. Embodiments are envisioned in which the filter is first and the lens in arranged between the filter and the sensor.

The quartz fiber F typically has a temperature in a range of 500 to 2,000 degrees Celsius. The thermographic sensor signal contains information about the infrared energy radiating from the quartz fiber F in a temperature range of 500 to 2,000 degrees Celsius.

Figure 4:
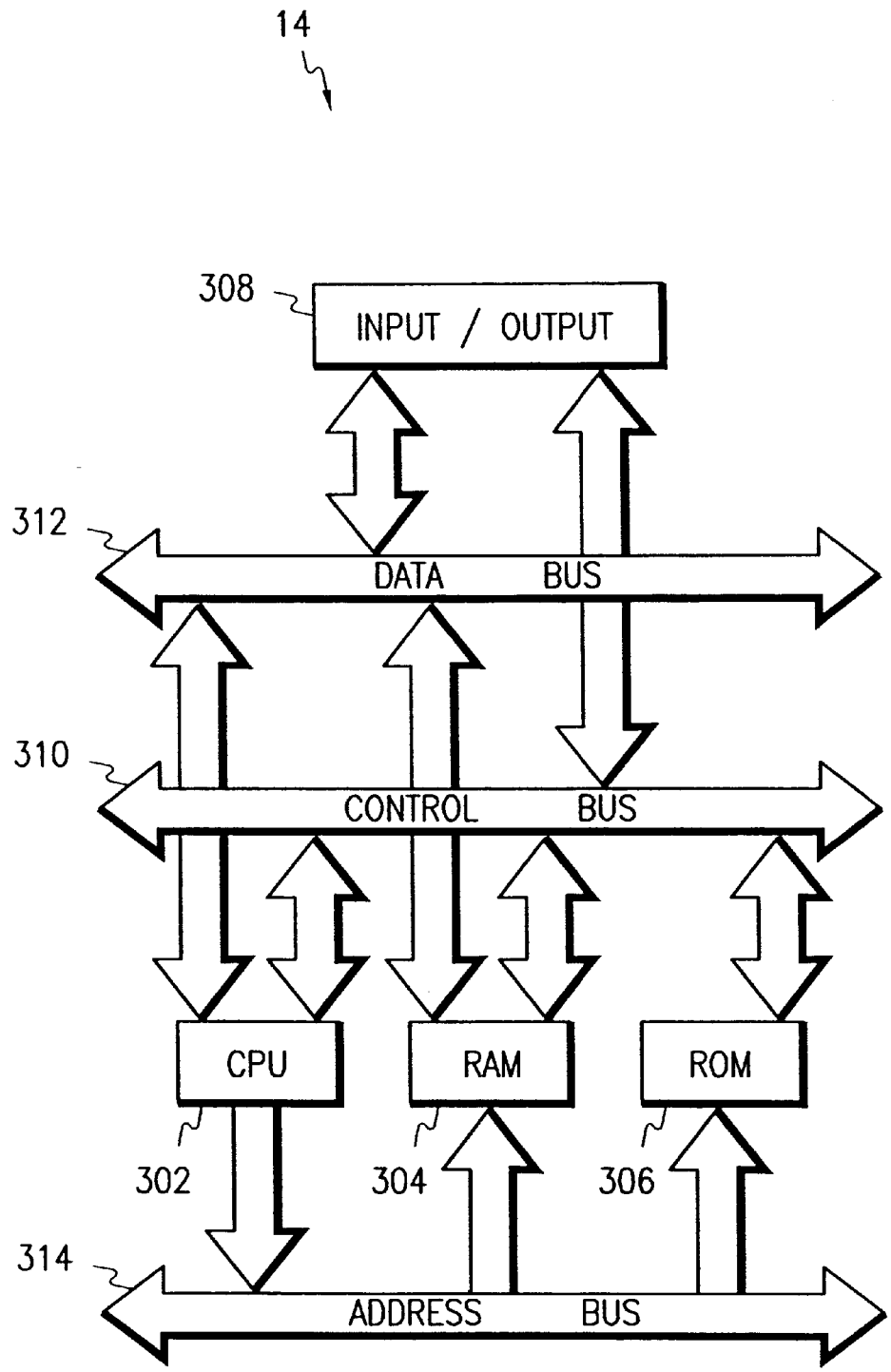
FIG. 4 is a block diagram of a thermographic profiling processor shown in FIGS. 1 and 2.

FIG. 4: The Thermographic Profiling Processor 14

The thermographic profiling processor 14 may comprise microprocessor-based circuitry generally shown in FIG. 4, including a combination of a central processor (microprocessor) 302, a random access memory 304, a read only memory 306, an input/output device 308, and an address, control and data bus generally indicated as 310, 312, 314 for connecting the combination. The microprocessor-based circuitry in FIG. 4 is shown by way of example, and the scope of the invention is also not intended to be limited to any particular configuration of microprocessor-based circuitry. The scope of the invention is not intended to be limited to any particular implementation of the thermographic profiling processor 14 or the combination of hardware and software to effect such an implementation. in view of more detailed design parameters set forth below, a person skilled in the art could implement the thermographic profiling processor 14 using a combination of hardware and software.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

What is claimed is:

1. A thermographic fiber sensor and processing device for a fiber draw furnace that draws a fiber from a preform, comprising:

a thermographic sensor, responsive to energy radiating circumferentially from the surface of the fiber, for providing a thermographic sensor signal containing information about the energy circumferentially radiating from the surface of the fiber; and a thermographic profiling processor, responsive to the thermographic sensor signal, for providing a thermographic profiling processor signal containing information about a thermographic profile of variations in the heat radiating circumferentially from the surface of the fiber.

2. A thermographic fiber sensor and processing device according to claim 1, wherein the fiber is quartz glass; and wherein the thermographic sensor includes an infrared filter for filtering out infrared energy outside a range of 8–2 microns radiating from the quartz fiber.

3. A thermographic fiber sensor and processing device according to claim 1, wherein the fiber is quartz glass; and wherein the thermographic sensor includes an infrared sensor that senses infrared energy inside a range of 8–12 microns radiating from the quartz fiber.

4. A thermographic fiber sensor and processing device according to claim 1, wherein the fiber is quartz glass; and wherein the thermographic sensor includes a lens and infrared filter for focusing and filtering out infrared energy outside a range of 8–12 microns radiating from the quartz fiber.

5. A thermographic fiber sensor and processing device according to claim 1, wherein the fiber is quartz glass; and wherein the quartz fiber has a temperature in a range of 500 to 2,000 degrees Celsius; and wherein the thermographic sensor signal contains information about the infrared energy radiating from the quartz fiber in a temperature range of 500 to 2,000 degrees Celsius.

6. A thermographic fiber sensor and processing device according to claim 1, wherein the thermographic profile includes variations in the heat emitted across the width of the fiber.

7. A thermographic fiber sensor and processing device according to claim 1, wherein the thermographic profile includes variations in the heat emitted along the length of the fiber.

8. A thermographic fiber sensor and processing device according to claim 1, wherein the thermographic profile includes variations in the heat emitted across the width of and along the length of the fiber.

9. A thermographic fiber sensor and processing device according to claim 1, wherein the thermographic profiling processor comprises microprocessor circuitry having a combination of a microprocessor, a random access memory, a read only memory, an input/output device, and an address, control and data bus for connecting the combination.

10. A thermographic fiber sensor and processing device according to claim 1, wherein the thermographic profiling processor signal contains information to control the temperature of the fiber draw furnace.

11. A thermographic fiber sensor and processing device according to claim 1, wherein the thermographic profiling processor signal contains information to control the speed of the fiber being drawn from the preform.

12. A thermographic fiber sensor and processing device according to claim 1, wherein the fiber draw furnace further comprises a furnace temperature controller; and wherein the furnace temperature controller responds to the thermographic profiling processor signal, for providing a furnace temperature controller signal to control the temperature of the fiber draw furnace.

13. A thermographic fiber sensor and processing device according to claim 1, wherein the fiber draw furnace further comprises a speed controller; and wherein the speed controller responds to the thermographic profiling processor signal, for providing a speed controller signal to control the speed of a capstan and a spool drawing the fiber from the preform.

14. A fiber draw furnace for drawing a fiber from a quartz preform, comprising:

a furnace heater, responsive to a furnace heater control signal, for heating the preform.

a capstan and spool, responsive to a speed control signal, for drawing the fiber from the preform at a given speed;

an infrared thermographic sensor, responsive to infrared energy radiating circumferentially from the surface of the fiber being drawn from the preform, for providing an infrared thermographic sensor signal containing information about the infrared energy radiating circumferentially from the surface of the fiber;

a thermographic profiling processor, responsive to the infrared thermographic sensor signal, for providing a thermographic profiling processor signal containing information about the infrared energy radiating circumferentially from the surface of the fiber to control the temperature of the fiber draw furnace and the given speed of the capstan and spool drawing the fiber from the preform;

a furnace heater controller, responsive to the thermographic profiling processor signal, for providing the furnace heater control signal to control the temperature of the furnace heater heating the preform; and a speed controller, responsive to the thermographic profiling processor signal, for providing the control signal to control the speed of the capstan and spool drawing the fiber from the preform.

15. A fiber draw furnace according to claim 14, wherein the fiber is quartz glass; and wherein the infrared thermographic sensor includes an infrared filter for filtering out infrared energy outside a range of 8–12 microns radiating from the quartz fiber.

16. A fiber draw furnace according to claim 14, wherein the fiber is quartz glass; and wherein the infrared thermographic sensor includes an infrared sensor for sensing infrared energy inside a range of 8–12 microns radiating from the quartz fiber.

17. A fiber draw furnace according to claim 14, wherein the fiber is quartz glass; and wherein the infrared thermographic sensor includes a lens and infrared sensor for focusing and sensing infrared energy inside a range of 8–12 microns radiating from the quartz fiber.

18. A fiber draw furnace according to claim 14, wherein the fiber is quartz glass; and wherein the quartz fiber has a temperature in a range of 500 to 2,000 degrees Celsius; and wherein the thermographic sensor signal contains information about the infrared energy radiating from the quartz fiber in a temperature range of 500 to 2,000 degrees Celsius.

19. A fiber draw furnace according to claim 14, wherein the thermographic profile includes variations in the heat emitted across the width of the fiber.

20. A fiber draw furnace according to claim 14, wherein the thermographic profile includes variations in the heat emitted along the length of the fiber.

21. A fiber draw furnace according to claim 14, wherein the thermographic profile includes variations in the heat emitted across the width of and along the length of the fiber.

22. A fiber draw furnace according to claim 14, wherein the thermographic profiling processor comprises microprocessor circuitry having a combination of a microprocessor, a random access memory, a read only memory, an input/output device, and an address, control and data bus for connecting the combination.

23. A fiber sensor and processor device, comprising:

a thermographic sensor, responsive to energy radiating from a fiber being drawn from a preform, for providing a thermographic sensor signal containing information about the energy radiating from the fiber; and a thermographic profiling processor, responsive to the thermographic sensor signal, for providing a thermographic profiling processor signal containing information about a thermographic profile of variations in the heat emitted across the width or along the length of the fiber.

24. A fiber sensor and processing device according to claim 23, wherein the fiber is quartz glass; and wherein the thermographic sensor includes an infrared filter for filtering out infrared energy outside a range of 8–12 microns radiating from the quartz fiber.

25. A fiber draw furnace according to claim 23, wherein the thermographic profiling processor comprises microprocessor circuitry having a combination of a microprocessor, a random access memory, a read only memory, an input/output device and an address, control and data bus for connecting the combination.

* * * * *

UNITED STATES PATENT AND TRADEMARK OFFICE
CERTIFICATE OF CORRECTION

PATENT NO.   : 6,232,583 B1
DATED        : May 15, 2001
INVENTOR(S)  : Uhm

Page 1 of 1

It is certified that error appears in the above-identified patent and that said Letters Patent is hereby corrected as shown below:

<u>Column 5,</u>
Line 28, delete "8-2 microns" and insert -- 8-12 microns --.

Signed and Sealed this

Eighth Day of January, 2002

*Attest:*

*Attesting Officer*

JAMES E. ROGAN
*Director of the United States Patent and Trademark Office*